United States Patent [19]

Hamada et al.

[11] Patent Number: 4,679,909
[45] Date of Patent: Jul. 14, 1987

[54] LIQUID CRYSTAL INPUT/OUTPUT MATRIX PANEL

[75] Inventors: Hiroshi Hamada; Fumiaki Funada, both of Yamatokoriyama; Masataka Matsuura, Tenri, all of Japan

[73] Assignee: Sharp Kabushiki Kaisha, Osaka, Japan

[21] Appl. No.: 744,961

[22] Filed: Jun. 17, 1985

[30] Foreign Application Priority Data

Jun. 20, 1984 [JP] Japan .................................. 59-128023

[51] Int. Cl.$^4$ ............................................... G06F 3/02
[52] U.S. Cl. .................................................. 350/333
[58] Field of Search ...................... 340/707, 784, 765; 350/333, 332, 331 T, 342

[56] References Cited

U.S. PATENT DOCUMENTS 4,345,248 8/1982 Togashi et al. ...................... 340/707

Primary Examiner—Arthur G. Evans
Attorney, Agent, or Firm—Birch, Stewart, Kolasch & Birch

[57] ABSTRACT

Numerous photoelectric translation cells are arranged to correspond to associated picture elements in an active type matrix LCD display system. When a light pen is used as an input means, the system allows detection of light beam positions, enabling it to function as an input means.

The liquid crystal input/output system constructed in this manner has advantages of low power consumption and thin and lightweight construction as compared with conventional input/output systems using a combination of CRT and light pen. It is best suited for applications in portable electronic appliances and offers great technical benefit by arranging the photoelectric translation cells in a manner so as to increase the aperture ratio of the matrix display.

8 Claims, 5 Drawing Figures

LIQUID CRYSTAL INPUT/OUTPUT MATRIX PANEL

BACKGROUND OF THE INVENTION

1. Field of the Invention

This invention comprises an information input/output system, driven by a printed circuit board on which numerous switching elements are integrated to individually correspond to associated picture elements arranged in a matrix (so-called "active matrix drive"); more specifically, a liquid crystal input/output system which allows information input via a light pen.

2. Description of the Prior Art

As a result of the recent trend toward office and laboratory automation, demand has steadily increased for input/output systems which act as man-machine interfaces in information exchange between man and labor-saving machines. Various kinds of display units such as LCD, CRT, LED, EL, PDP and VFD are used to relay information from the machines. On the other hand, keyboards, touch panels, graphic tablets, voice, etc. are employed as means of inputting characters and graphics, etc., According to the intended purpose. In addition to these means, which are classified as unilateral, the light pen has been put into practical application as a bilateral means of transmiting information; it consists of a photo-electric translation element called a "light pen" and a CRT (Braun tube). When the light pen is brought close to the CRT screen, beams from the CRT scan the position of the pen, the photo-electric translation element in the pen detecting the light and outputting the corresponding pulse. By comparing the timing of this pulse and that of the corresponding detection signal from the CRT, the position of the light pen can be determined. This method offers the advantages of ease in graphic input and simplicity of operation on the interactive method, which can be performed by persons not well trained in keyboard operation. However, it poses shortcomings such as higher power consumption, greater depth of unit and image warping, etc., problems inherent in CRT'S.

OBJECTS AND SUMMARY OF THE INVENTION

OBJECTS OF THE INVENTION

The invention has overcome the above-mentioned drawbacks by incorporating photo-electric translation cells in the LCD in combination with a light-emitting light pen. The invention's chief objective is to provide a new type of input/output system which is slim, lightweight, easy-to-carry and which has low power consumption.

Other aims and applications are stated in the detailed description. However, the detailed description and specific examples, while indicating the preferred embodiments of the invention, are merely illustrative. Various changes and modifications within the spirit and scope of the invention should become apparent to those familiar with the concepts from the detailed description.

SUMMARY OF THE INVENTION

In this section, basic construction of the present invention is explained in reference to a color LCD panel, which consists of numerous picture element electrodes arranged in a dot matrix fashion, and an LCD layer which modulates light according to voltage and numerous color-developing means corresponding to said picture elements. Using image signals corresponding to desired colors, images can be displayed in even neutral tints on the same additive mixture used for color CRT's.

LCD panels for different operation modes are available; twisted nematic (TN), guest-host (GH), dynamic scattering mode (DSM) and phase transition mode. The system on the present invention is adaptable to any of these, but best results are achieved with the TN and GH modes. In the GH mode, black pigments allow the LCD to function as a so-called "black shutter". For more information on liquid crystals, please refer to the reference work "Fundamentals and applications of liquid crystal electronics" edited by Sasaki and published by Ohm Publishing Co, Ltd. (in 1979).

For independent control of individual picture elements, any of the following three methods is normally employed.

(1) Simple matrix

A pair of substrates, each with a set of electrodes arranged in rows on the surface, are matched and glued so that the rows will perpendicularly intersect each other, forming a panel. LCD panels built in this fashion are normally powered by the voltage equalizing method. Line selection signals are fed in succession to the electrodes arranged horizontally (rows), while image signals are simultaneously fed to the electrodes arranged vertically (columns). Each point where rows and columns cross functions as a picture element, the liquid cyrstal sandwiched between the electrodes responding to the potential difference created between them.

Since liquid crystal responds to effective values, the number of scanning lines is limited in view of possible crosstalk and dynamic range. The following two methods have been developed to overcome these limitations.

(2) Addition of non-linear element

This method suppresses crosstalk by improving threshold characteristics through the addition of non-linear elements such as varistar, MIM (Metal/Insulator/Metal) or back-to-back diode, to each picture element.

(3) Addition of switching element (Active matrix)

This method independently powers each picture element by adding a switching transistor. In this method, voltage is applied during selection, causing the electrical charge to be stored and held in the capacitor even during the non-selection period. Thus, voltages with waveshapes nearly equal to those in the static drive method are applied to the liquid crystal. The liquid crystal itself is a capacitive load in this case. If its time constant is sufficiently large compared with the repetitive driving cycle, said storage capacitor may be omitted. As the switching transistor, a thin film transistor or MOS-FET (field effect transistor) formed on a silicon wafer can be used.

This invention enables the formation of the photoelectric translation cell and the switching element in one process (each will be described in detail later). Though most effective when applied to method (3) above, it can easily be adpated to other methods as well. It can also be adapted to practically every display pattern, including character display, graphic and image displays.

The tri-color additive mixture method is normally used for color production. For color developing, interference filters or filters of inorganic or organic dyes and pigments are used. These may be provided on either the outside or on the inside of the LCD panel substrates. In the latter case, they may be provided either on or under the picture element electrodes or common electrode.

In LCD panels, only one tri-color can be utilized out of the spectrum of the incident light. The remaining components are absorbed by the color developing means. If liquid crystal operation requires a polarizing plate, the amount of light that can be utilized is further reduced, resulting in a very dim display screen in reflective type applications using no lighting means. To remedy this, an incandescent bulb, fluorescent tube, EL panel or a similar light source or an other means of directing ambient light to the back of the LCD panel is used. In view of the stringent power supply restriction in portable appliances, improvement of light source efficiency is essential.

In this invention, a matrix of photo-diode or similar photo-electric translation cells is formed on a color LCD panel with the above mentioned characteristics, so that each cell is matched with a picture element. By scanning the surface of the display screen with a light pen, light is received by the photo-electric translation cells and patterns corresponding to the loci drawn with the light pen are input, enabling the LCD system to display and input information. As it utilizes an LCD panel, this display system has advantages of thin and lightweight design and reduced power consumption. Furthermore, information input can be carried out quickly yet easily by the use of to photo-electric translation cells which correspond to associated picture elements. Light pen positions corresponding to said photo-electric translation cell positions are indicated by the detection signals transmitted from the photo-electric translation cells responding to the light from the pen. Loci drawn by the pen are detected in succession via photo-electric translation cells.

BRIEF DESCRIPTION OF THE DRAWINGS

The present invention will be better understood from the detailed description and accompanying drawings. These show mere illustrations and are thus not limitative of the present invention.

DESCRIPTION OF PREFERRED EMBODIMENTS

For one of the two cell substrates constituting the LCD cell, a TFT (Thin Film Transistor)-photo diode substrate is prepared. TFT and photo diodes (two-terminal photo-electric translation cells) used in this embodiment of the invention are each formed to correspond to each picture element arranged in the matrix. Photo diodes need not have junctions or show rectification characteristics. In this embodiment, TFTs powering the liquid crystal and photo diodes for light detection are formed simultaneously on a substrate in the same process. Each photo diode has a construction identical to that of the TFT, less gate electrode and light shield, resulting in a photoconductive cell of electrode/semiconductor film/electrode construction.

Figure 1:
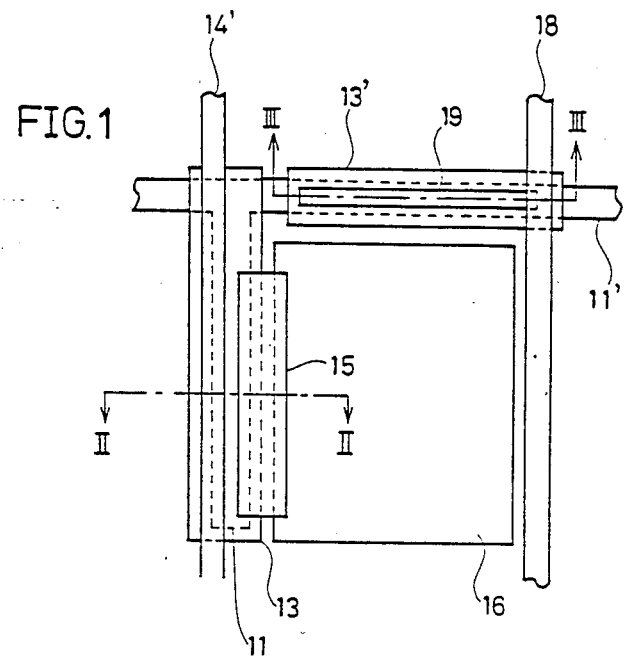
FIG. 1 is a schematic view of the TFT photo diode substrate, the embodiment of this invention.
Figure 2:
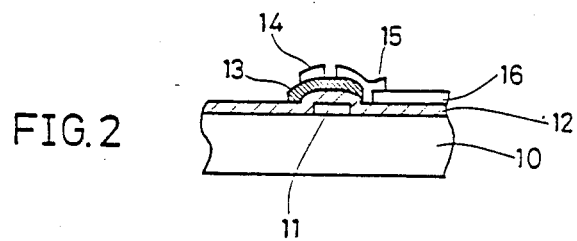
FIG. 2 and FIG. 3 are cross-sectional views of the TFT photo diode substrate in FIG. 1, in directions II—II and III—III, respectively.
Figure 3:
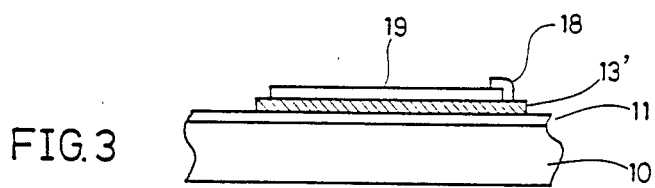

To read out which photo diodes are subject to the light from the pen, one end of the photo diode is connected to the TFT gate line and the other to the data readout line. FIG. 1 schematically shows the said TFT and photo diode, and FIGS. 2 and 3 are cross-sectional views along II—II and III—III, respectively. The TFT is constructed by successively laminating patterned layers of gate electrode (11), gate insulation film (12), semiconductor film (13) source electrode (14) and drain electrode (15) on a transparent substration (10) of insulator-like soda glass, hard glass, quartz glass, plastic or ceramic. Each TFT has a corresponding picture element (16) arranged in the matrix, a drain electrode (15), a picture element electrode (16) and a storage capacitor, provided as necessary. Gate electrodes (11) corresponding to TFT rows are connected by a common gate line (11)', while source electrodes (14) corresponding to TFT columns are connected by a common data write line (14)'. Each gate line (11)' and data write line (14)' is arranged in a matrix to form a TFT at each cross point.

Each photo diode has a semiconductor film (13)' for light detection between the gate line (11)' and the data readout line (18), which is arranged parallel with the above-mentioned data write line (14)'. The photo diode is arranged so that the two electrodes are parallel to each other in the same plane, with both bridged via semiconductor film, as in the TFT. One of the pair may be formed using transparent conductive film, creating a sandwich structure supporting the electrodes. In the former construction, the photo diode reacts to light striking either side of the TFT substrate; however, a poor aperture ratio (the ratio of the effective area of picture elements to total display unit area) may result. In the latter case, although light can only be detected from the transparent conductive film side, more effective gate line and data readout line wiring can be obtained, allowing higher aperture ratios. In this embodiment, the semiconductor film (13)' island is provided on the gate line (11)', upon which ITO transparent film (19) is stacked and of which one end is connected with the data readout line (18). Thin semiconductor film material (13 and 13') used for TFT and photo diode is selected from among simple substances or mixtures belonging of group IV, doped with necessary impurities (stoichiometric or nonstoichiometric compounds, solid solutions, alloys, etc.) or from among un-doped simple substances or mixtures belonging group VI. They may be of single or multiple crystal form or amorphous from a crystallographical point of view. The semiconductor film (13)' used in detection may be formed simultaneously with the TFT semiconductor film (13), or with different materials. Vacuum deposition, sputtering CVD, plasma CVD or vacuum CVD techniques can be used, and formed into desired patterns using the shadow mask method or photolithography.

To prevent possible malfunction due to ambient light, a light shield is provided for the TFT and a filter is located above the photo diode. The spectrum of light passing through the filter above the photo diode should match the spectrum of light emitted from the pen, but with narrower band width. Using such a filter, only selected ligth beam components from the pen can be detected. In addition, an orientation film which is rubbing-treated is used to help intensify liquid crystal orientation.

Figure 4:
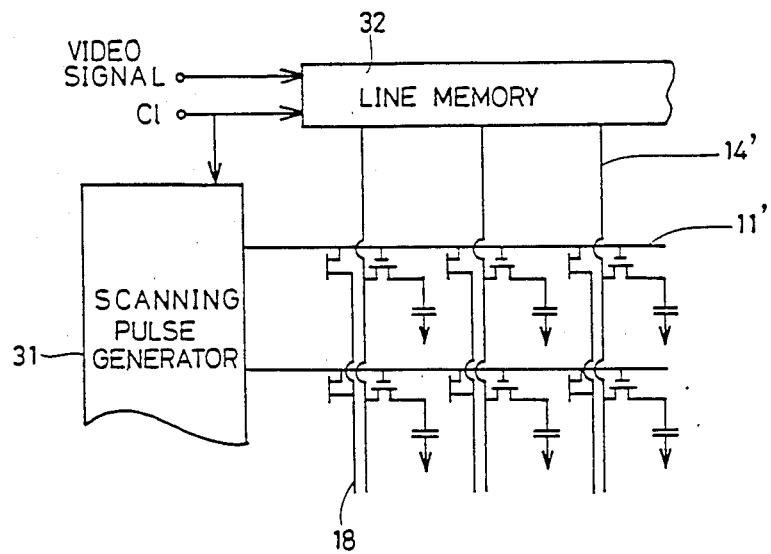
FIG. 4 is a block diagram illustrating the drive circuit for the TFT.

Powering of the liquid crystal in these TFT-photo diode substrates is basically carried out following a sequential line selection method. When an n-type semiconductor is used as the TFT semiconductor film (13), an electron storage layer is formed when a positive voltage is applied across the gate electrode (11) at the gate insulation film (12) interface to vary resistance between the source electrode (14) and the drain electrode (15). FIG. 4 is a block diagram showing one embodiment of the drive circuit used in this system. Scanning pulse is applied by the scanning pulse generator (31) to the gate line (11)' at regular intervals to turn the TFT ON. Image signals for one scanning line are stored tentatively in line memory (32). They are then applied simultaneously to the write line (14)' in synchronization with the scanning pulse, then applied via TFT to the picture element electrode (16) and storage capacitor, provided as necessary. As the potential at the picture element electrode (16) changes, the effective value of the voltage applied to the liquid crystal also changes, powering liquid crystal display. When neutral tints are desired for display, an analog line memory is used (32). It can be replaced with a digital line memory or shift register when neutral tints are not required. The storage capacitor retains voltage to be applied to the liquid crystal even when the TFT is OFF. No storage capacitor is needed if the liquid crystal time constant is sufficiently large relative to the scanning cycle.

Figure 5:
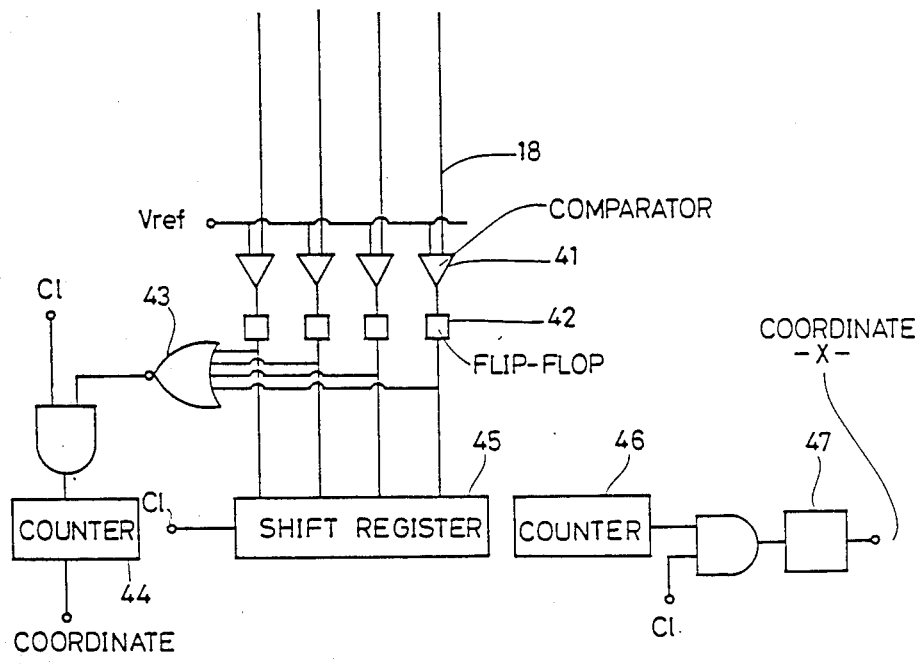
FIG. 5 is a block diagram showing one embodiment of the light pen position detection circuit.

Photo diode detection of light pen position is as follows. Suitable materials with lower conductivity when dark and higher conductivity when light are selected. When light strikes the semiconductor film (13'), resistance falls, transmitting scanning pulse applied to the gate line (11)' to readout line (18). This pulse is detected by the comparator which is connected to each data readout line. The X coordinate is determined by locating the comparator at which the pulse has appeared; coordinate Y is determined by the time at which said pulse appears. This processing can be performed by a simple circuit as, for example, shown in FIG. 5. Output from each comparator (41) is maintained in the peak-hold circuit or with RS flip-flop (42); output is then transmitted to an OR circuit (43). It is reset to "0" at the beginning of each field, and then changed to "1" as the photo diode receiving the light is scanned. The Y coordinate can be obtained by computing the number of scanning pulses during the period when output from the OR circuit (43) is "0" using the Y coordinate counter (44). In this way, pen light is received by two or more photo diodes; the one located at the top-most position is detected. The X coordinate can be obtained by scanning the outputs in the peak-hold circuit or with the RS flip-flop (42) during vertical retrace. If it is impossible to process during vertical retrace, maintained outputs may tentatively be transferred to a different shift register (45) for scanning during the next field. Calculation of the number of clock pulses fed until the first "1" is encountered may also be used, with the RS flip-flop (42) and counter (46) serving as the X coordinate. These circuits may be arranged either externally or on the peripheral parts on the TFT substrate. In the latter case, the number of terminals connecting the TFT substrate with the external circuits can be reduced. The effects of ambient light can be dealt with by adjusting reference voltage (V ref) at the comparator (41).

Another cell substrate matched to the TFT-photo diode cell substrate is then fabricated; it consists of a transparent conductive film and color filter on a transparent substrate made of glass or similar material. An interference filter, inorganic or organic dyes or pigments are used for the color filter. It is prepared by photolithography or printing technique and consists of three primary colors arranged in rows or mosaic fashion, upon which ITO transparent conductive film is laid using the ion-plating technique or similar method. On top, an orientation layer is provided to aid liquid crystal orientation.

These two cell substrate sheets are bonded together via a spacer; liquid crystal is then injected between the substrates to form the LD panel. When the filled liquid crystal is of the TN mode, polarizing plates are attached to the front and back sides of the panel.

The light pen consists of a light source and lens set in a pen-shaped case. Incandescent bulb with filter, light-emitting diode or semiconductor laser, etc. are used as a light source. As described earlier, the light source spectrum should be as narrow as possible. When a light-emitting diode is used, its mesial magnitude should be set in the range of about 10 to 100 nm. Light is output as a beam through the lens fitted at one end of the light pen. Accordingly, when light is emitted while moving the light pen on the screen of the above-mentioned LCD panel, light strikes the photo diodes in the LCD panel, whch then identify the corresponding loci.

The above-mentioned embodiment consists of TFTs and photo diodes arranged on a transparent substrate and a liquid crystal which is operated in a light transmission mode. In other embodiments of the present invention, Si or other semiconductor substrates may be used and liquid crystal driving transistors and photo-electric translation cells may be arranged for liquid crystal reflection mode operation.

Following this description, it is obvious that the technique may be varied in many without departure from the spirit and scope of the invention, which is limited only by the following claims:

We claim:
1. An information input/output system comprising:
   an information matrix display panel including,
      a plurality of common gate lines arranged in parallel with each other;
      a plurality of common data write lines arranged in parallel with each other and perpendicular to said common gate lines;
      a plurality of common data read-out lines in parallel with said data write lines and dispersed therebetween;
      a plurality of picture display elements each disposed between a common data write line and a common date read out line and between successive common gate lines, a gate portion of each common gate line extending along an edge of said picture display element perpendicular to said common gate line, said gate portion extending across substantially the entire length of said picture display element;
      a semiconductor region forming a channel between said gate portion and a common data write line;
      a drain electrode formed over a part of said semiconductor region and an edge of said picture display element;
      a light detection layer formed over a region of each said common gate line adjacent to said picture display element and perpendicular to said data read out line;
      a transparent conductive film formed over said light detection layer and connected to said data read out line, said gate portion, semiconducor region, common data write line and drain electrode forming switching means of each said picture display element for applying an output voltage thereto for the display of information on said element, said light detection layer, transparent conductive film and data readout line forming a photoelectric translation cell of each said picture display element for detecting light patterns inputted to said display panel.

2. An information input/output system in accordance with claim 1, in which said information matrix display panel is an LCD panel.

3. An information input/output system in accordance with claim 1, in which said photoelectric translation cell is a of photo diode.

4. An information input/output system in accordance with claim 1, in which said switching means is composed of thin film transistors.

5. An information input/output system in accordance with claim 1, in which said photoelectric translation cells are connected with a voltage supply line which controls said switching means.

6. An inforamtion input/output system in accordance with claim 1, in which said light patterns are inputted from a light pen which has an emission spectrum of narrow band width.

7. An information input/output system in accordance with claim 6, in which each of said photoelectric translation cells is equipped with a filter allowing transmission of only selected components of the light beam emission spectrum from said light pen.

8. An information input/output system as claimed in claim 1, wherein said plurality of common gate lines are composed of a metal, each of said common gate lines preventing light incident on a rear surface of said panel from impinging on the photoelectric translation cell formed thereon.

* * * * *